United States Patent
Di Fiore et al.

(10) Patent No.: US 8,974,975 B2
(45) Date of Patent: Mar. 10, 2015

(54) METHOD TO CORRECT FOR PERMEATION UNCERTAINTIES USING A CONCENTRATION SENSOR

(75) Inventors: Daniel C. Di Fiore, Scottsburg, NY (US); Thomas W. Tighe, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 13/205,883

(22) Filed: Aug. 9, 2011

(65) Prior Publication Data
US 2013/0040211 A1 Feb. 14, 2013

(51) Int. Cl.
*H01M 8/06* (2006.01)
*H01M 8/04* (2006.01)

(52) U.S. Cl.
CPC ........ *H01M 8/04753* (2013.01); *H01M 8/0662* (2013.01); *H01M 8/04305* (2013.01); *H01M 8/04447* (2013.01); *H01M 8/04455* (2013.01); *H01M 8/0447* (2013.01); *H01M 8/04783* (2013.01); *Y02E 60/50* (2013.01); *H01M 2220/20* (2013.01)
USPC ............................ 429/410; 429/415; 429/444

(58) Field of Classification Search
None
See application file for complete search history.

(56) References Cited

U.S. PATENT DOCUMENTS

2006/0110640 A1* 5/2006 Yoshida et al. .................. 429/25
2008/0145720 A1* 6/2008 Sinha et al. ..................... 429/13

OTHER PUBLICATIONS

Tighe, Thomas W., "Acoustic Speed of Sound Measurement Using Bandpass Filtering of Automotive Pressure Sensors", U.S. Appl. No. 13/104,671, filed May 10, 2011.
DiFiore, Daniel C., "Flow Estimation Based on Anode Presure Response in Fuel Cell System", U.S. Appl. No. 12/971,982, filed Dec. 17, 2010.
Harris, Daniel I., "Anode Gas Composition Utilizing H2 Injection Pressure Wave Propagation Rates", U.S. Appl. No. 12/913,324, filed Oct. 27, 2010.

* cited by examiner

*Primary Examiner* — Milton I Cano
*Assistant Examiner* — Carmen Lyles-Irving
(74) *Attorney, Agent, or Firm* — John A. Miller; Miller IP Group, PLC

(57) ABSTRACT

A method for determining a rate of accumulation of nitrogen in an anode side of a fuel cell stack. The method includes determining a concentration of nitrogen in an anode loop and determining a number of moles of nitrogen in the anode loop. The method also includes determining a rate of accumulation of nitrogen in the anode loop and determining a permeability factor of nitrogen through fuel cell membranes in the fuel cell stack using the determined rate of accumulation of nitrogen in the anode loop.

20 Claims, 3 Drawing Sheets

METHOD TO CORRECT FOR PERMEATION UNCERTAINTIES USING A CONCENTRATION SENSOR

BACKGROUND OF THE INVENTION

1. Field of the Invention

This invention relates generally to a system and method for determining the permeation rate of nitrogen into an anode subsystem and, more particularly, to a system and method for determining the permeation rate of nitrogen into an anode subsystem using a gas concentration sensor and comparing the determined permeation rate of nitrogen to a model of expected nitrogen permeation to adapt an anode bleed schedule as needed.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, cathode side partial pressures will cause oxygen and nitrogen to permeate through the membrane. The permeated oxygen is reduced in the presence of the anode catalyst, but the permeated nitrogen in the anode side of the fuel cell stack dilutes the hydrogen. If the nitrogen concentration increases above a certain percentage, such as 50%, the fuel cell stack becomes unstable and may fail.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode subsystem. However, the model estimation may contain errors, particularly as degradation of the components of the fuel cell system occurs over time. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

As discussed above, the performance of the fuel cell system is influenced by the composition of gases entering the stack on the anode and cathode. During normal operation of the fuel cells, nitrogen from the cathode side permeates through the membrane to the anode side, which dilutes the fuel concentration. If there is too much nitrogen or water in the anode side, cell voltages may decrease. Gas concentration sensors may be used that measure the concentration of gases within a given subsystem, however, the state of health of a fuel cell membrane can only be determined using the permeation rate. Therefore, there is a need in the art for a strategy to adapt an anode bleed schedule based on changes in permeation rate of gases, such as nitrogen, through the fuel cell membranes.

SUMMARY OF THE INVENTION

The present invention discloses a method for determining a rate of accumulation of nitrogen in an anode side of a fuel cell stack in a fuel cell system that includes determining a concentration of nitrogen in an anode loop and determining a number of moles of nitrogen in the anode loop. The method also includes determining a rate of accumulation of nitrogen in the anode loop and determining a permeability factor of nitrogen through fuel cell membranes in the fuel cell stack using the determined rate of accumulation of nitrogen in the anode loop.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the permeation rate of nitrogen into an anode subsystem is merely exemplary in nature, and is in no way intended to limit the invention or its applications or uses.

Figure 1:
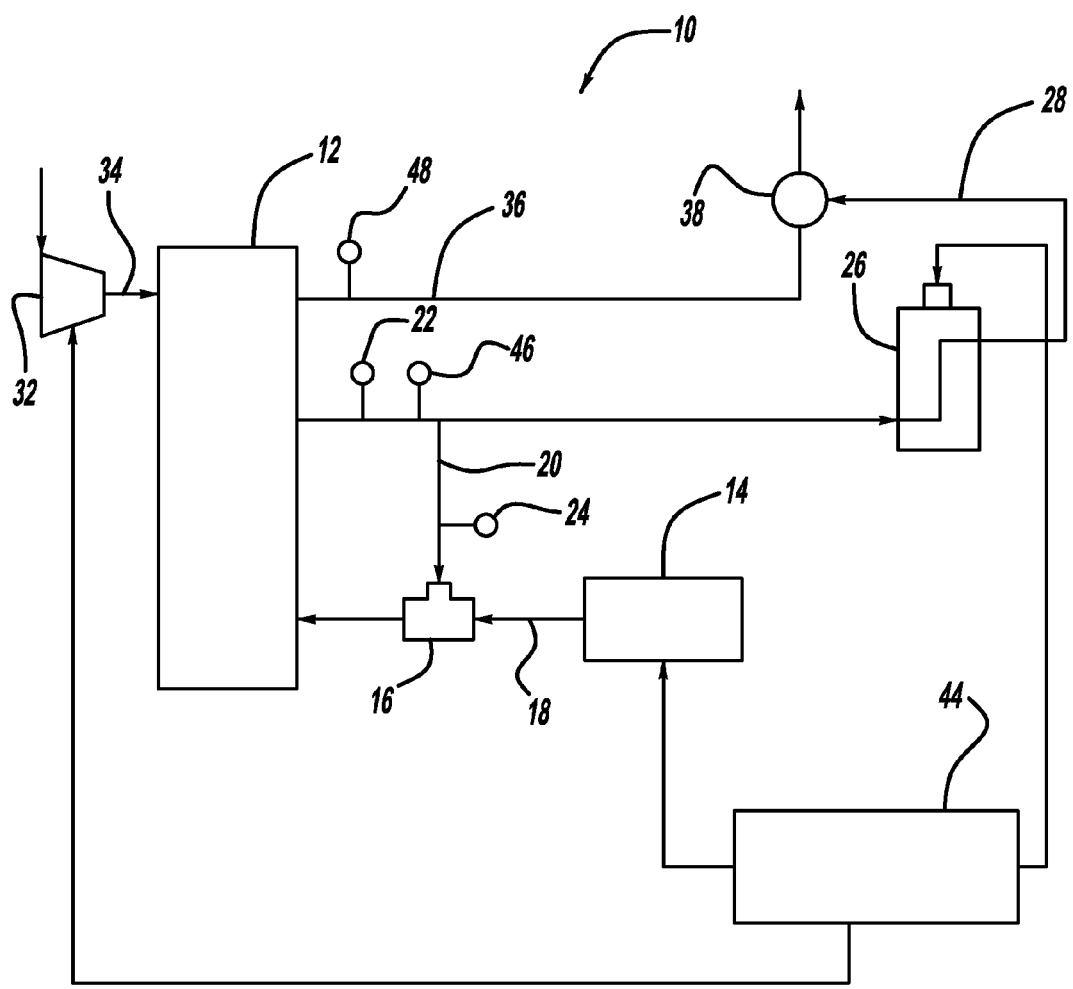
FIG. 1 is a simplified block diagram of a fuel cell system.

FIG. 1 is a simplified block diagram of a fuel cell system 10 including a fuel cell stack 12. Hydrogen gas from a hydrogen source 14 is provided to the anode side of the fuel cell stack 12 on an anode input line 18 utilizing an injector 16, such as an injector/ejector, as described in U.S. Pat. No. 7,320,840 entitled, "Combination of Injector-Ejector for Fuel Cell Systems," issued Jan. 22, 2008, assigned to the assignee of this application and incorporated herein by reference. An anode effluent gas provided at an output of the anode side of the stack 12 is routed back into the fuel cell stack 12 on an anode recirculation line 20. The anode input line 18, the injector 16, the anode side of the stack 12 and the anode recirculation line 20 are all components that make up an "anode subsystem," and the anode input line 18 and the anode recirculation line 20 make up an "anode loop" as is known to those skilled in the art. Nitrogen cross-over from the cathode side of the fuel cell stack 10 dilutes the hydrogen in the anode side of the stack 12, thereby affecting fuel cell stack performance. Therefore, it is necessary to periodically bleed the anode effluent gas from the anode subsystem using a bleed valve 26 to reduce the amount of nitrogen in the anode subsystem, i.e., in the anode side of the fuel cell stack 12. When the bleed valve 26 is open, the bled anode exhaust gas flows through a bleed line 28.

The anode loop includes a first pressure sensor 22 and a second pressure sensor 24, spaced apart by a known distance, as described in copending patent application Ser. No. 12/913,324, entitled "Anode Gas Composition Utilizing H2 Injection Pressure Wave Propagation Rates," filed Oct. 27, 2010, assigned to the assignee of this application and incorporated herein by reference. As shown in the system 10, the pressure sensors 22 and 24 may be located in the anode recirculation line 20. However, one of the pressure sensors 22 or 24 may be located in the anode inlet line 18 at a location between the injector 16 and the stack 12. Furthermore, instead of the two sensors 22 and 24 being pressure sensors, e.g., automotive pressure sensors, one or both of the sensors 22 and 24 may be a piezoelectric sensor, i.e., an acoustic sensor, as described in copending patent application Ser. No. 13/104,671, "Acoustic Speed of Sound Measurement Using Bandpass Filtering of Automotive Pressure Sensors," filed May 10, 2011, assigned to the assignee of this application and incorporated herein by reference. A temperature sensor 46 for measuring the temperature of the anode gas in the recirculation line 20 is also provided. The concentration sensor may also consist of a gas thermal conductivity based device.

Air from a compressor 32 is provided to the cathode side of the fuel cell stack 12 on line 34. A cathode gas is output from the fuel cell stack 12 on a cathode gas line 36. The line 34, the cathode side of the stack 12 and the cathode gas line 36 are all part of a "cathode subsystem." A mixing device 38 is provided in the line 36 for mixing the cathode gas from the stack 12 and the bled anode exhaust gas from the line 28. In an alternate embodiment, the mixing device 38 may be provided in the line 34 for mixing the cathode gas with the bled anode exhaust gas from the line 28, although this embodiment is not shown for the sake of clarity. A pressure sensor 48 in the cathode gas line 36 measures the pressure of the cathode side of the stack 12.

A controller 44 monitors the temperature and pressure of the anode subsystem and the cathode subsystem of the fuel cell system 10, controls the speed of the compressor 32, controls the injection of hydrogen from the injector 16 to the anode side of the stack 12, and controls the position of the anode bleed valve 26, as is discussed in more detail below.

Most sensors that measure the gas composition in a given subsystem are capable of determining the gas concentrations within that given subsystem. The gas concentration in an anode recirculation line can be determined utilizing the following equation:

$$y_{N_2}^{AnOut} = \frac{n_{N_2}}{n_{H_2} + n_{N_2} + n_{H_2O}} \quad (1)$$

Where $y_{N_2}^{AnOut}$ is the concentration of nitrogen, $n_{N_2}$ is the number of moles of nitrogen, $n_{H_2}$ is the number of moles of hydrogen and $n_{H_2O}$ is the number of moles of water.

To correct for changes in permeation rate of the membranes in the fuel cell stack 12, it is important to isolate the molar accumulation of nitrogen from the concentration change of nitrogen. The reason it is important to separate the molar accumulation of nitrogen from the concentration change of nitrogen in the anode subsystem is because there are multiple sources of error that can cause a concentration difference between a model that estimates the concentration of nitrogen in the anode subsystem and the determined concentration of nitrogen in the anode subsystem as measured by the sensors 22 and 24. In addition, bleed flow rate errors through the bleed valve 26 can cause a concentration error between the modeled nitrogen concentration and the determined concentration of nitrogen from the sensors 22 and 24, however, the permeation rate of nitrogen through the membranes of the fuel cells in the fuel cell stack 12 is unaffected by this error. Thus, the state of health of the membranes in the fuel cell stack 12 can only be determined using the permeation rate of nitrogen through the membranes. Determining the permeation rate of nitrogen and adjusting an anode bleed schedule based on changes in the permeation rate are discussed in detail below.

Because the concentration of nitrogen can change based on the number of moles of water and hydrogen present without changing the number of moles of nitrogen, this concentration effect must be corrected before any judgment can be made on the permeation rate of nitrogen through the membranes of the fuel cell stack 12. By solving for the number of moles of nitrogen and applying the ideal gas law, equation (1) becomes:

$$n_{N_2} = \frac{P_{An} \cdot V}{R \cdot T} \cdot y_{N_2}^{AnOut} \quad (2)$$

Where $P_{An}$ is the pressure in the anode loop in kPa, V is the anode volume in liters, R is the ideal gas constant (approximately 8.3144 kPa·L·mol$^{-1}$·K$^{-1}$), and T is the anode fluid temperature in Kelvin.

Using equation (2), the nitrogen accumulation is now independent of the pressure of the fuel cell system 10, and thus the nitrogen accumulation may be compared to an expected permeation rate of nitrogen. By observing the number of moles of nitrogen that accumulate between bleed events, it is possible to determine the rate of accumulation of nitrogen. However, this level of correction for changes in nitrogen accumulation is still not enough to accurately compare the nitrogen model to the sensor measurements for the purpose of adapting an anode bleed schedule. One final determination must be made to accurately compare the nitrogen model to the sensor measurements before a permeability factor can be calculated. To calculate the permeability factor, the following equation is used.

$$k_{N_2} = \frac{2 \cdot \dot{n}_{N_2} \cdot t_{mem}}{AA \cdot N_{cell} \cdot \left(P_{An} \cdot \left(y_{N_2}^{AnIn} + y_{N_2}^{AnOut}\right) - P_{Ca} \cdot \left(y_{N_2}^{CathIn} + y_{N_2}^{CathOut}\right)\right)} \quad (3)$$

Where $k_{N_2}$ is the permeability factor, AA is the active area of the cell, $N_{cell}$ is the number of cells within a fuel cell stack, $t_{mem}$ is the membrane thickness of the membrane material that is used to make the membrane of each cell, $y_{N_2}^{AnIn}$ is the concentration of nitrogen in the anode inlet, and $\dot{n}_{N_2}$ is the rate of accumulation of nitrogen in the anode side of the stack, which may be determined, for example, by the method described in copending U.S. patent application Ser. No. 12/971,982, entitled, "Flow Estimation Based on Anode Pressure Response in Fuel Cell System," filed Dec. 17, 2010, assigned to the assignee of the present application and incorporated herein by reference. $P_{Ca}$ is the pressure of the cathode subsystem, $y_{N_2}^{CathIn}$ is the concentration of nitrogen in the cathode inlet, which may be measured or assumed to be the concentration of nitrogen in air, and $y_{N_2}^{CathOut}$ is the concentration of nitrogen in the cathode outlet, which may be assumed to be the expected concentration of nitrogen in the cathode exhaust after the fuel cell reaction has taken place, or may be a measured value.

The resulting permeability factor, $k_{N_2}$, from equation (3) may be directly compared to the model value of nitrogen permeability to the anode side of the fuel cell stack 12 to determine the amount of correction, i.e., adaption, to the anode bleed schedule that is needed, if any.

Figure 2:
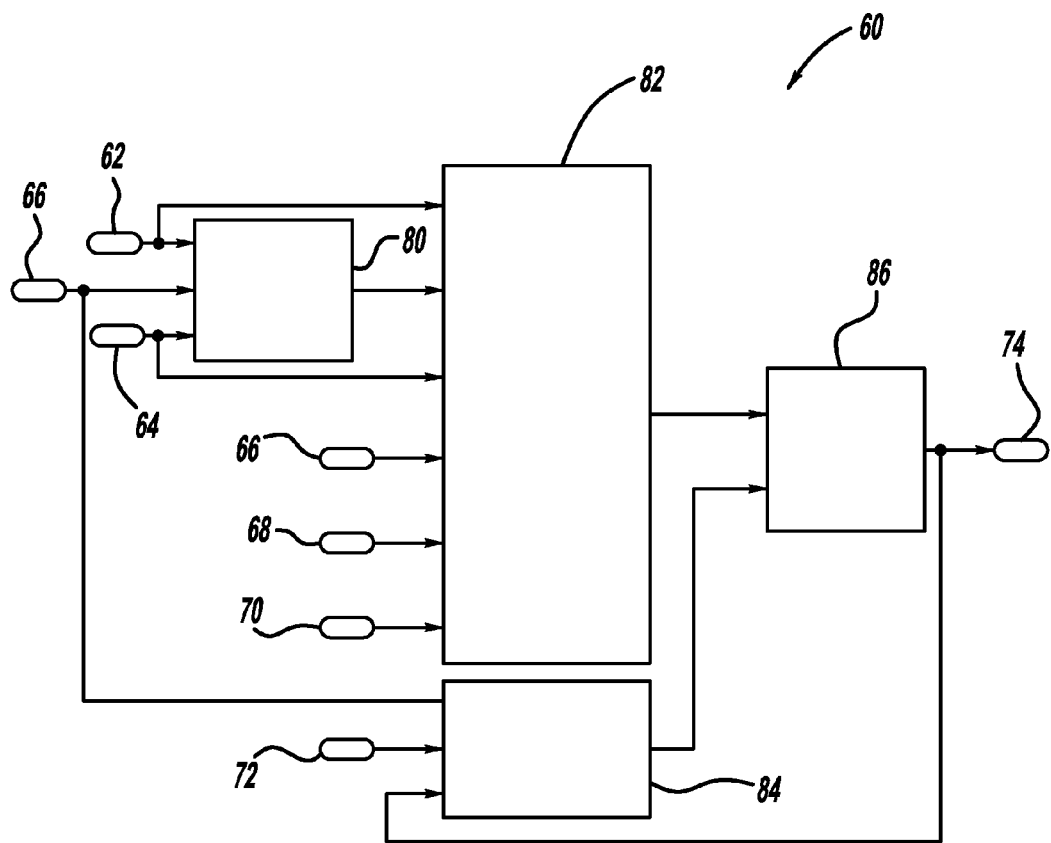
FIG. 2 is a flow chart diagram of an algorithm for determining the permeation rate of nitrogen into an anode subsystem.

FIG. 2 is a flow diagram 60 of an algorithm for determining a permeation gain due to changes in the permeation rate of nitrogen through the membranes of the fuel cell stack 12. An anode outlet nitrogen concentration input 62 is provided to a pressure correction algorithm 80 and a permeation flow calculation 82. As discussed above, the anode outlet nitrogen concentration may be determined using the sensors 22 and 24. An anode loop pressure input 64 is also provided to the pressure correction algorithm 80 and the permeation flow calculation 82. The anode pressure may be measured using the pressure sensor 22 or 24. A temperature input 66 that measures the temperature of the anode fluid is inputted into the pressure correction algorithm 80 and is also inputted into a nitrogen model box 84.

The anode outlet nitrogen concentration input 62, the anode loop pressure sensor input 64 and the temperature sensor input 66 are used to determine the rate of accumulation of nitrogen in the anode side of the fuel cell stack 12, i.e., the rate of accumulation of nitrogen in the anode loop, using the equations (1) and (2) as discussed above. The determined rate of accumulation of nitrogen from the pressure correction algorithm 80 is then provided to the permeation flow calculation 82.

A cathode pressure input 66, a cathode inlet nitrogen concentration input 68 and a cathode outlet nitrogen concentration input 70 are provided to the permeation flow calculation 82. Using the inputs 62, 64, 66, 68 and 70, a permeability factor of nitrogen through the membranes of the stack 12 may be determined according to equation (3), discussed above.

As discussed above, the temperature input 66 is provided to the nitrogen model box 84. A lambda input 72 that indicates the water content of the membranes in the fuel cell stack 12, which may be measured or estimated, is also inputted into the nitrogen model box 84 to determine a model permeability factor of nitrogen through the membranes of the stack 12. The determined nitrogen permeability factor from the permeation flow calculation 82 and the model permeability factor from the nitrogen model box 84 are provided to an adaptive controller box 86. A permeation gain output 74 that is determined by comparing the determined nitrogen permeability factor from the permeation flow calculation 82 and the model permeability factor from the nitrogen model box 84 are provided from the adaptive controller box 86 to the nitrogen model box 84 to adapt an anode bleed schedule as needed. The anode bleed schedule will be adapted if the permeation gain exceeds a predetermined threshold, such as a predetermined percentage.

Figure 3:
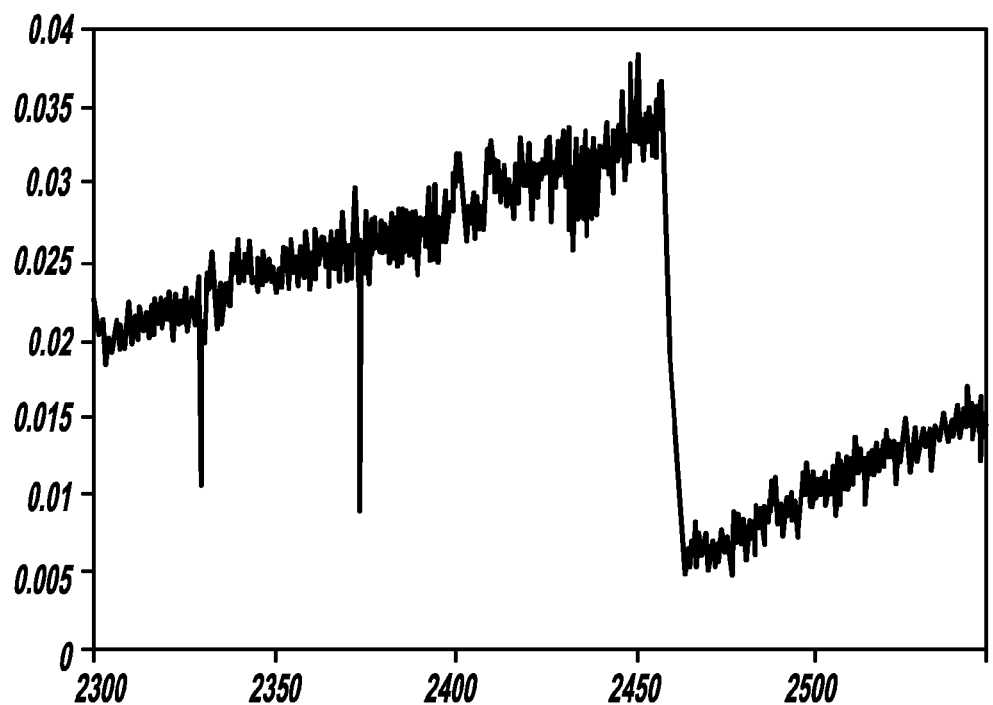
FIG. 3 is a graph with time on the x-axis and number of moles of nitrogen in an anode subsystem on the y-axis, illustrating the effect of correcting for pressure changes when calculating the number of moles of nitrogen in the anode subsystem.
Figure 3:
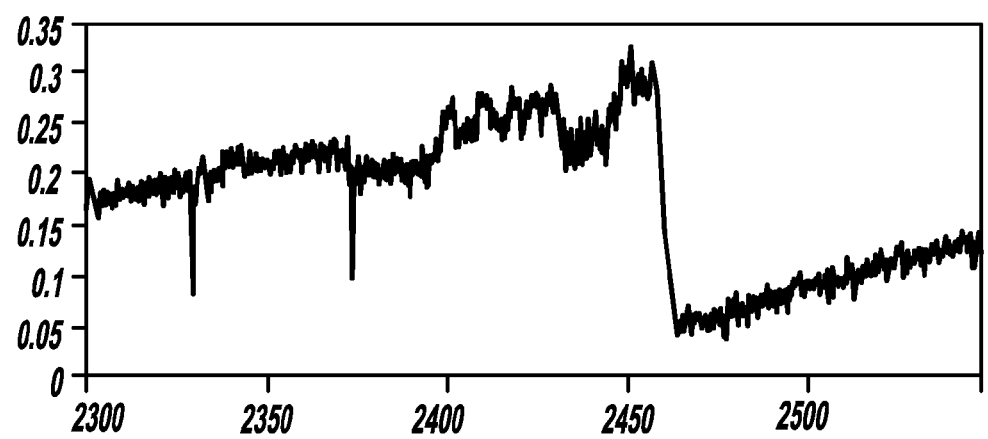

FIG. 3 shows two graphs with time on the x-axis. The top graph shows the number of moles of nitrogen in an anode subsystem on the y-axis, and the bottom graph shows the concentration of nitrogen in the anode outlet. By comparing the bottom graph to the top graph, the effect of correcting the nitrogen concentration in the anode loop can be observed. The top plot of FIG. 3 illustrates the effect of correcting the nitrogen model based on the determined number of moles of nitrogen in the anode loop. The top plot, which uses the determined number of moles of nitrogen, is a smooth increasing signal between bleed events. The bottom plot, which uses the determined concentration of nitrogen, decreases when the system pressure increases, which happens at approximately 2,350 seconds in FIG. 3. The slope of the top graph can be easily determined, and from the slope the permeability factor of nitrogen can be found. Thus, the algorithm as discussed above can be applied to an adaptive controller to more accurately correct a bleed schedule as needed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for adapting an anode bleed strategy for a fuel cell stack in a fuel cell system, said method comprising:
   determining a concentration of nitrogen in an anode loop of the fuel cell system;
   determining a number of moles of nitrogen in the anode loop of the fuel cell system;
   determining a rate of accumulation of nitrogen in the anode loop of the fuel cell system;
   determining a permeability factor of nitrogen through fuel cell membranes in the fuel cell stack using the determined rate of accumulation of nitrogen in the anode loop of the fuel cell system;
   comparing the determined permeability factor of nitrogen to an expected permeability factor of nitrogen to determine a nitrogen permeability gain; and
   adapting the anode bleed strategy for the fuel cell system if a predetermined threshold value of the nitrogen permeability gain has been achieved.

2. The method according to claim 1 wherein determining the concentration of nitrogen in the anode loop of the fuel cell system includes determining the concentration of gases in the anode loop using at least one sensor.

3. The method according to claim 1 wherein determining the rate of accumulation of nitrogen in the anode loop of the fuel cell system includes observing the accumulation of moles of nitrogen in the anode loop that occurs between bleed events.

4. The method according to claim 1 wherein determining the permeability factor of nitrogen through the fuel cell membranes in the fuel cell stack using the determined rate of accumulation of nitrogen in the anode loop includes using the equation:

$$k_{N_2} = \frac{2 \cdot \dot{n}_{N_2} \cdot t_{mem}}{AA \cdot N_{cell} \cdot \left(P_{An} \cdot \left(y_{N_2}^{AnIn} + y_{N_2}^{AnOut}\right) - P_{Ca} \cdot \left(y_{N_2}^{CathIn} + y_{N_2}^{CathOut}\right)\right)}$$

where $k_{N_2}$ is the permeability factor, AA is an active area of the cell, $N_{cell}$ is the number of cells within the fuel cell stack, $t_{mem}$ is a membrane thickness of membrane material that is used to make the membrane of each cell, $y_{N_2}^{AnIn}$ is the concentration of nitrogen in the anode inlet, $\dot{n}_{N_2}$ is the rate of accumulation of nitrogen in the anode side of the stack, $P_{Ca}$ is the pressure of the cathode subsystem, $y_{N_2}^{CathIn}$ is the concentration of nitrogen in the cathode inlet, and $y_{N_2}^{CathOut}$ is the concentration of nitrogen in the cathode outlet.

5. The method according to claim 4 wherein the cathode inlet nitrogen concentration and the cathode outlet nitrogen concentration are an assumed value or a measured value.

6. The method according to claim 1 wherein the expected permeability factor of nitrogen is based on a model estimation.

7. A method for adapting an anode bleed strategy for a fuel cell stack in a fuel cell system, said method comprising:
   providing an anode bleed schedule based on an expected permeability factor of nitrogen through fuel cell membranes that are between an anode side and a cathode side of fuel cells in the fuel cell stack;
   determining a concentration of nitrogen in an anode loop of the fuel cell system;
   determining a number of moles of nitrogen in the anode loop of the fuel cell system;
   determining a rate of accumulation of nitrogen in the anode loop of the fuel cell system;
   determining a permeability factor of nitrogen from a cathode side of the fuel cell stack to the anode side of the fuel cell stack through the fuel cell membranes;
   comparing the determined permeability factor of nitrogen to an expected permeability factor of nitrogen to determine a nitrogen permeability gain; and
   adjusting the anode bleed strategy for the fuel cell system if a predetermined threshold value of the nitrogen permeability gain has been achieved.

8. The method according to claim 7 wherein determining the concentration of nitrogen in an anode loop of the fuel cell system includes determining the concentration of the gases in an anode loop using at least one sensor.

9. The method according to claim 7 wherein determining the rate of accumulation of nitrogen in the anode loop of the fuel cell system includes observing the accumulation of moles of nitrogen in the anode loop that occurs between bleed events.

10. The method according to claim 7 wherein determining the permeability factor of nitrogen through the fuel cell membranes in the fuel cell stack using the determined rate of accumulation of nitrogen in the anode loop includes using the equation:

$$k_{N_2} = \frac{2 \cdot \dot{n}_{N_2} \cdot t_{mem}}{AA \cdot N_{cell} \cdot \left(P_{An} \cdot \left(y_{N_2}^{AnIn} + y_{N_2}^{AnOut}\right) - P_{Ca} \cdot \left(y_{N_2}^{CathIn} + y_{N_2}^{CathOut}\right)\right)}$$

where $k_{N_2}$ is the permeability factor, AA is an active area of the cell, $N_{cell}$ is the number of cells within the fuel cell stack, $t_{mem}$ is a membrane thickness of membrane material that is used to make the membrane of each cell, $y_{N_2}^{AnIn}$ is the concentration of nitrogen in the anode inlet, $\dot{n}_{N_2}$ is the rate of accumulation of nitrogen in the anode side of the stack, $P_{Ca}$ is the pressure of the cathode subsystem, $y_{N_2}^{CathIn}$ is the concentration of nitrogen in the cathode inlet, and $y_{N_2}^{CathOut}$ is the concentration of nitrogen in the cathode outlet.

11. The method according to claim 10 wherein the cathode inlet nitrogen concentration and the cathode outlet nitrogen concentration are an assumed value or a measured value.

12. The method according to claim 7 wherein the expected permeability factor of nitrogen is based on a model estimation.

13. The method according to claim 7 wherein the amount of adaptation of the anode bleed strategy is dependent on a predetermined threshold value of the nitrogen permeability gain that has been achieved.

14. A method for determining a rate of accumulation of nitrogen in an anode side of a fuel cell stack in a fuel cell system, said method comprising:
   determining a concentration of nitrogen in an anode loop of the fuel cell system;
   determining a number of moles of nitrogen in the anode loop of the fuel cell system;
   determining a rate of accumulation of nitrogen in the anode loop of the fuel cell system; and
   determining a permeability factor of nitrogen through fuel cell membranes in the fuel cell stack using the determined rate of accumulation of nitrogen in the anode loop of the fuel cell stack.

15. The method according to claim 14 wherein determining the concentration of nitrogen in an anode loop of the fuel cell system includes determining the concentration of the gases in an anode loop using at least one sensor.

16. The method according to claim 14 wherein determining the rate of accumulation of nitrogen in the anode loop of the fuel cell system includes observing the accumulation of moles of nitrogen between bleed events.

17. The method according to claim 14 wherein determining the permeability factor of nitrogen through the fuel cell membranes in the fuel cell stack using the determined rate of accumulation of nitrogen in the anode loop includes using the equation:

$$k_{N_2} = \frac{2 \cdot \dot{n}_{N_2} \cdot t_{mem}}{AA \cdot N_{cell} \cdot \left(P_{An} \cdot \left(y_{N_2}^{AnIn} + y_{N_2}^{AnOut}\right) - P_{Ca} \cdot \left(y_{N_2}^{CathIn} + y_{N_2}^{CathOut}\right)\right)}$$

where $k_{N_2}$ is the permeability factor, AA is an active area of the cell, $N_{cell}$ is the number of cells within the fuel cell stack, $t_{mem}$ is a membrane thickness of membrane material that is used to make the membrane of each cell, $y_{N_2}^{AnIn}$ is the concentration of nitrogen in the anode inlet, $\dot{n}_{N_2}$ is the rate of accumulation of nitrogen in the anode side of the stack, $P_{Ca}$ is the pressure of the cathode subsystem, $y_{N_2}^{CathIn}$ is the concentration of nitrogen in the cathode inlet, and $y_{N_2}^{CathOut}$ is the concentration of nitrogen in the cathode outlet.

18. The method according to claim 17 wherein the cathode inlet nitrogen concentration and the cathode outlet nitrogen concentration are an assumed value or a measured value.

19. The method according to claim 14 wherein the expected permeability factor of nitrogen is based on a model estimation.

20. The method according to claim 14 wherein the amount of adaptation of the anode bleed strategy is dependent on a predetermined threshold value of the nitrogen permeability gain that has been achieved.

* * * * *